US011178004B2

(12) United States Patent
Liu et al.

(10) Patent No.: US 11,178,004 B2
(45) Date of Patent: Nov. 16, 2021

(54) METHOD FOR TRANSMITTING PHYSICAL LAYER OPERATION ADMINISTRATION AND MAINTENANCE MESSAGE OVER ETHERNET AND SYSTEM THEREOF

(71) Applicant: 5V Technologies Ltd., Taipei (TW)

(72) Inventors: Chuan-Wei Liu, Taipei (TW); Wei-Pin Chen, Taipei (TW)

(*) Notice: Subject to any disclaimer, the term of this patent is extended or adjusted under 35 U.S.C. 154(b) by 0 days.

(21) Appl. No.: 16/860,069

(22) Filed: Apr. 28, 2020

(65) Prior Publication Data

US 2020/0389351 A1 Dec. 10, 2020

Related U.S. Application Data

(60) Provisional application No. 62/857,827, filed on Jun. 6, 2019.

(51) Int. Cl.
*H04L 12/24* (2006.01)
*H04L 29/06* (2006.01)
*H04L 29/08* (2006.01)
*H04J 14/02* (2006.01)

(52) U.S. Cl.
CPC .......... *H04L 41/08* (2013.01); *H04J 14/0249* (2013.01); *H04L 69/08* (2013.01); *H04L 69/323* (2013.01)

(58) Field of Classification Search
CPC ....... H04L 41/08; H04L 69/323; H04L 69/08; H04J 14/0249
See application file for complete search history.

(56) References Cited

U.S. PATENT DOCUMENTS

| 2005/0063416 | A1* | 3/2005 | Shin ..................... H04L 69/32 370/465 |
| 2007/0291777 | A1* | 12/2007 | Jamieson ................ G01D 5/00 370/401 |
| 2010/0104288 | A1* | 4/2010 | Zheng ................ H04Q 11/0067 398/67 |
| 2010/0110898 | A1* | 5/2010 | Effenberger ............ H04L 69/08 370/241.1 |
| 2014/0099101 | A1* | 4/2014 | Elhage .................... H04L 43/50 398/25 |

OTHER PUBLICATIONS

"TCP/IP Packet Headers", http://books.gigatux.nl/mirror/securitytools/ddu/ch06lev1sec3.html, 17 pages. (Year: 2018).*

* cited by examiner

*Primary Examiner* — Arvin Eskandarnia
*Assistant Examiner* — Chhian (Amy) Ling
(74) *Attorney, Agent, or Firm* — Opes IP Consulting Co. Ltd.

(57) ABSTRACT

The disclosure provides a method for transmitting a physical layer operation administration and maintenance (PLOAM) message over an Ethernet network. The method includes the steps of: transmitting, from a first terminal, the PLOAM message to a second terminal over a PLOAM channel connecting the first and second terminals; extracting, by the second terminal, the PLOAM message; sending, from the second terminal, the extracted PLOAM message to an external CPU over an Ethernet protocol; and processing, by the external CPU, the received PLOAM message to generate a processed PLOAM message.

12 Claims, 6 Drawing Sheets

METHOD FOR TRANSMITTING PHYSICAL LAYER OPERATION ADMINISTRATION AND MAINTENANCE MESSAGE OVER ETHERNET AND SYSTEM THEREOF

CROSS REFERENCE TO RELATED APPLICATION

The present application claims priority to U.S. Provisional Application Ser. No. 62/857,827, filed on Jun. 6, 2019, which are hereby incorporated by reference in its entirety.

FIELD

This disclosure relates to a method for transmitting messages and a system thereof, and more particularly, to a method for transmitting physical layer operation administration and maintenance (PLOAM) message over an Ethernet network, and to a communication system in which PLOAM message is transmitted over Ethernet.

BACKGROUND

Rapid developments can be seen in the realm of information technology, and the quick allocation of fundamental construction of networks, network broadband applications, such as online games, online learning and video conferences, are getting more and more popularized.

Optical fiber performs the characteristics of the high bandwidth, large capacity, low loss and robustness that cannot be influenced by electromagnetic wave. Compared with other propagation media, optical fiber provides the distinct advantages.

Due to vast and rapid growth in optical communication technology, optical fiber gradually replaces conventional copper transmission wire, which is originally used in the conventional manner of the communication, and becomes a trend for broadband network construction in the future. In the early stage, the telecommunication companies have built the optical fiber as the backbone network from the beginning, and now the construction of global backbone network/metro area network is almost in saturation. The optical fiber has been gradually developed toward the direction of being the access network, and various broadband access network technologies, mostly employing the optical fiber, are successfully developed.

PLOAM message, also known as physical layer operation administration and maintenance (PLOAM) message, exists in copper twisted pair broadband access technologies, like xDSL (ADSL, VDSL, VDSL2) and G.Fast.

Regarding to the processing of PLOAM message, reference is first made to FIG. 1, which illustrates a conventional optical network system 1 comprising an optical line terminal (OLT) 11, an optical network unit (ONU) 12 and a system on chip (SoC) 13. The OLT 11 and the ONU 12 collectively form the so-called passive optical network (PON). The OLT 11 and the ONT 12 are connected through fiber, where the ONT 12 and the SoC 13 are connected through Ethernet.

Physical layer operation administration and maintenance (PLOAM) message conventionally existed in between the OLT 11 and the ONU 12, so that the ONU 12 further includes a CPU 121 to process the PLOAM message.

However, under this conventional architecture, ONU must be built with CPU in order to deal with the PLOAM message, and that draws to certain disadvantages such that extra spaces in the ONU will be occupied by CPU.

SUMMARY OF THE DISCLOSURE

One of the purposes of the present disclosure is to provide a method for transmitting physical layer operation administration and maintenance (PLOAM) message over an Ethernet network Another purpose of the present disclosure is to provide a communication system in which PLOAM message is transmitted over an Ethernet network (i.e., Ethernet protocol).

The method for transmitting a physical layer operation administration and maintenance (PLOAM) message over an Ethernet network includes the steps of: transmitting, from a first terminal, the PLOAM message to the second terminal over a PLOAM channel connecting the first and second terminals; extracting, by the second terminal, the PLOAM message; sending, from the second terminal, the extracted PLOAM message to an external CPU over an Ethernet protocol; and processing, by the external CPU, the received PLOAM message to generate a processed PLOAM message.

The communication system includes a first terminal, a second terminal connecting with the first terminal through a fiber, and an external CPU connecting with the second terminal through an Ethernet protocol. A physical layer operation administration and maintenance (PLOAM) message is transmitted from the first terminal to the second terminal and the second terminal extracts the PLOAM message, and the second terminal then sends the extracted PLOAM message to the external CPU through the Ethernet protocol, and the external CPU processed the message to generate a processed PLOAM message.

DETAILED DESCRIPTION

Unless defined otherwise, all technical and scientific terms used herein have the same meanings as commonly understood by one of skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
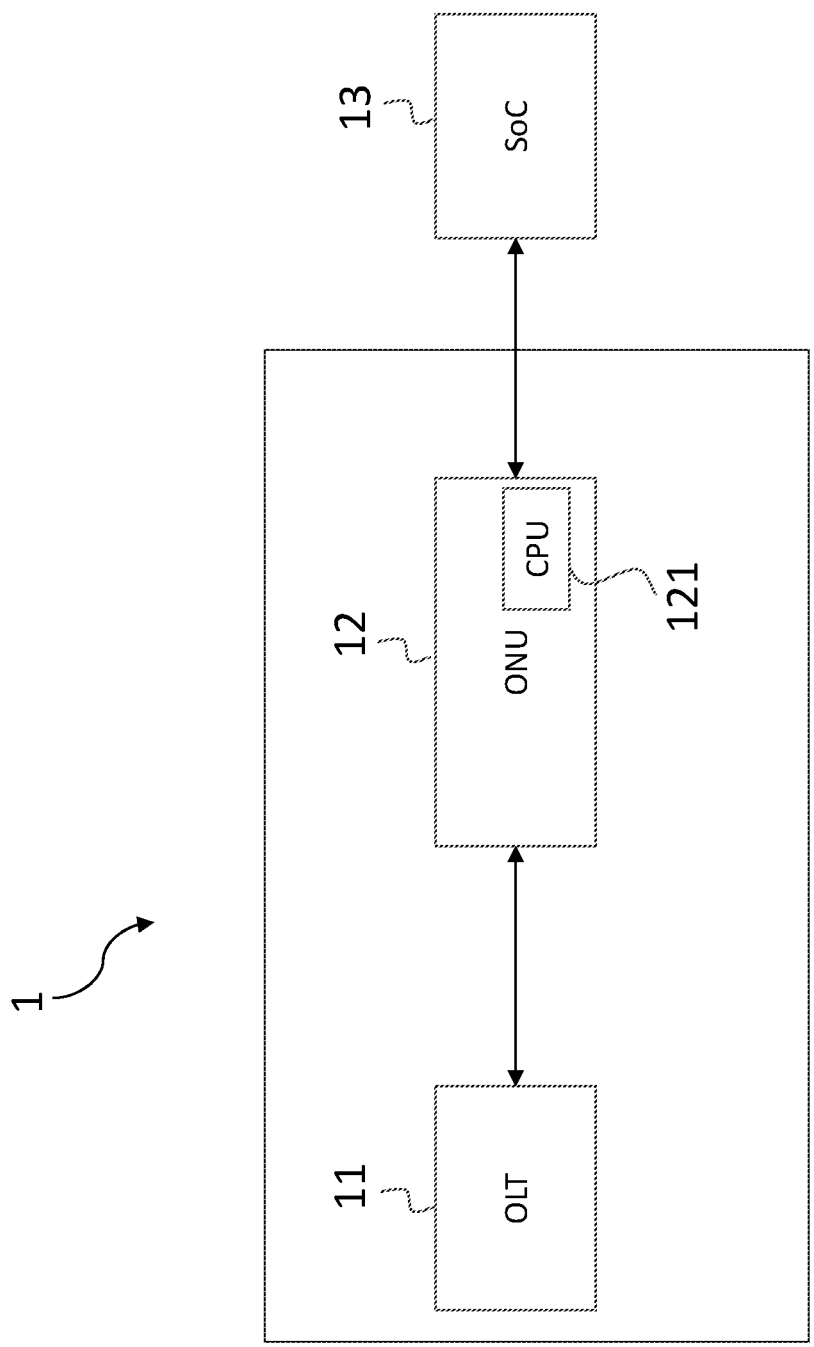
FIG. 1 illustrates a conventional optical network system.
Figure 2:
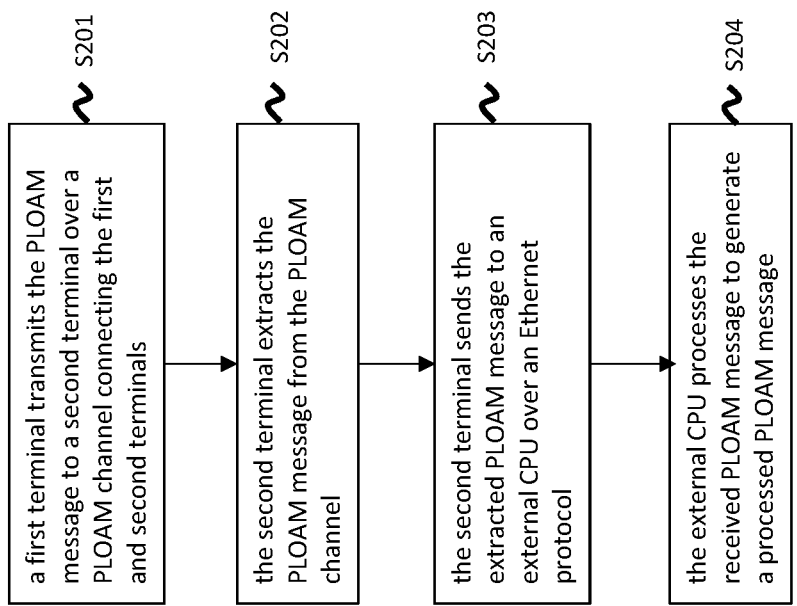
FIG. 2 illustrates a flowchart of a management method for an optical fiber network system according to an embodiment of the present disclosure.

Reference is first made to FIG. 2, which is a flowchart of a method for transmitting a physical layer operation administration and maintenance (PLOAM) message over an Ethernet network according to an embodiment of the present disclosure.

Referring to step S201 first, a first terminal transmits the PLOAM message to a second terminal over a PLOAM channel connecting the first and second terminals. Next, in step S202, the second terminal extracts the PLOAM message from the PLOAM channel. The second terminal then in step S203, sends the extracted PLOAM message to an external CPU over an Ethernet protocol. Finally in step S204, the external CPU processes the received PLOAM message to generate a processed PLOAM message.

It is worth to note that, in step S201, the PLAOM message is in a data format that can be transmitted through a PLOAM channel. However, when in step S202, the second terminal cannot just sent out the PLOAM message without any modification to the data, because the second terminal and the external CPU are connected through Ethernet protocol, and the data format of the PLOAM message is not compatible in Ethernet network. Therefore, the second terminal further, by performing an encoding scheme, to transform the PLOAM message into a specific packet format that can be transmitted over Ethernet protocol. This specific packet format is referred to as Ethernet protocol compatible packet format.

Figure 3:
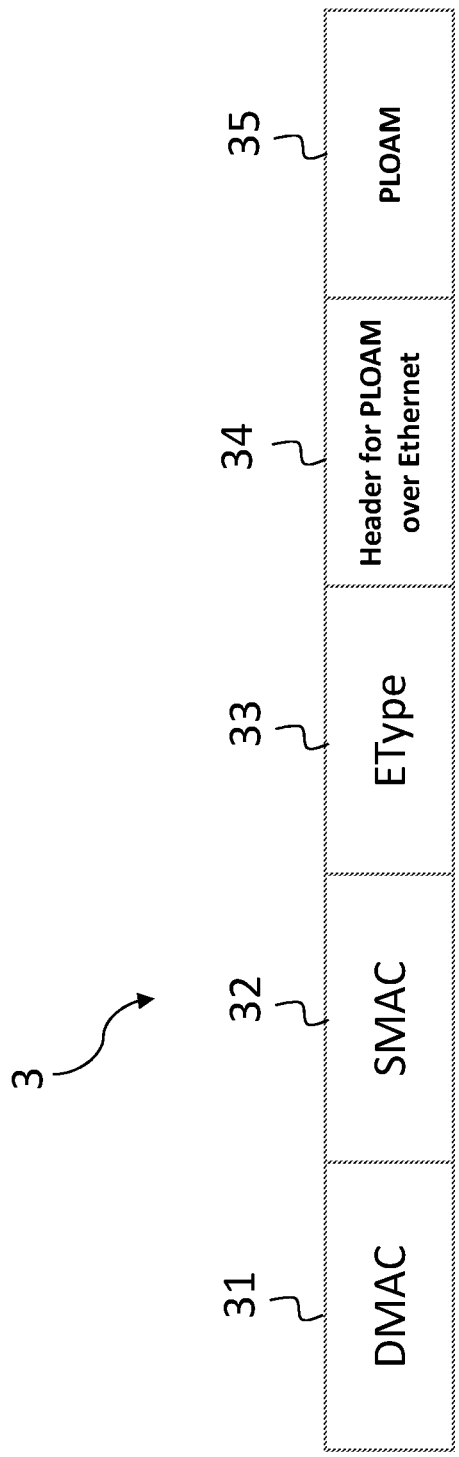
FIG. 3 illustrates a Ethernet protocol compatible packet format according to an embodiment of the present disclosure.

Reference is collectively made to FIG. 3, which illustrates the Ethernet protocol compatible packet format according to the embodiment of the present disclosure. In FIG. 3, the PLOAM-over-Ethernet packet format 3 includes a destination MAC (DMAC) address 31, a source MAC (SMAC) address 32, an Ether type (Etype) section 33, a header section 34 and a PLOAM message section 35.

To be more specific, the DMAC address 31, the SMAC address 32 and the Etype address sections 33 respectively takes up 6 bytes, 6 bytes and 4 bytes in the format 3. The header section 34 may be a standard header to convey PLOAM message over an Ethernet, while the header section 34 may also be user-defined header. The PLOAM message section 35 is defined by ITU-T and is especially for passive optical network (PON).

The PLOAM message originated from the OLT is processed at the external CPU rather than at the ONU. The external CPU, after processing, sends back the processed PLOAM message to the ONU through the Ethernet protocol. The ONU next extracts the processed PLOAM message from the Ethernet network. It should be noted that the processed PLOAM message is now in Ethernet data format, so that the ONU further performs a decoding scheme to the processed PLOAM message to transform the message into a PLOAM compatible data format, and sends the decoded message back to the OLT.

Figure 4:
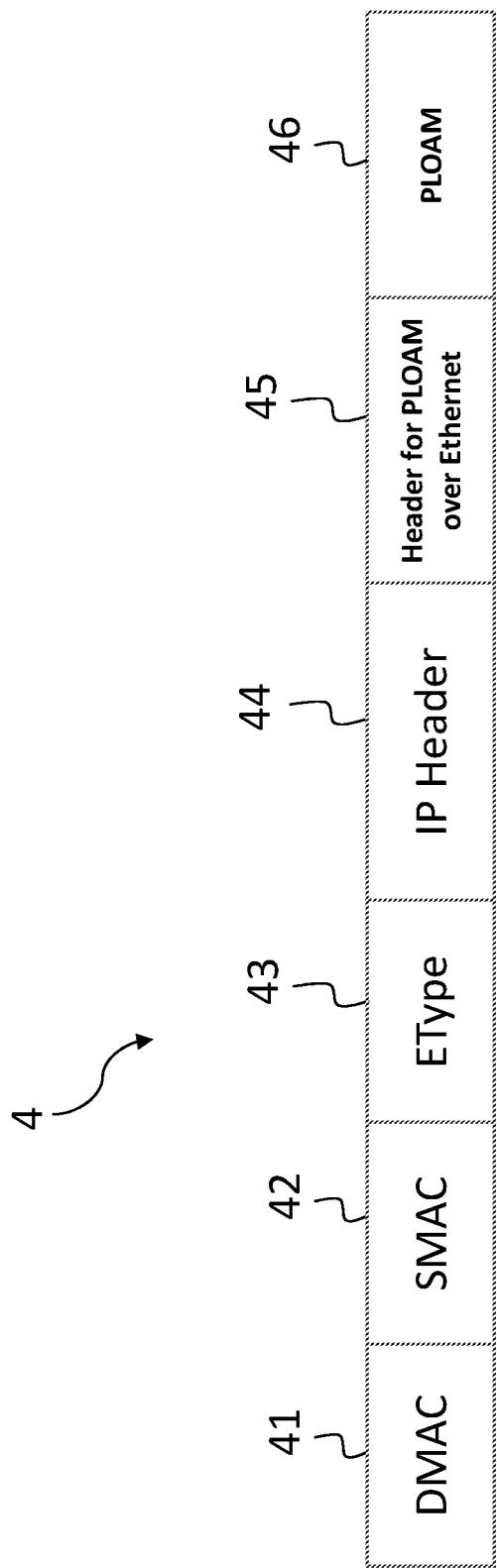
FIG. 4 illustrates a Ethernet protocol compatible packet format according to another embodiment of the present disclosure.

The packet format as described in FIG. 3 is in Layer 2 protocol (L2 protocol), which means that data is encoded into a L2 protocol data format and transmitted through Layer 2. However, it should be noted that the present disclosure is not limited to Layer 2 transmission only. Reference is next made to FIG. 4, which illustrates an Ethernet protocol compatible packet format according to another embodiment of the present disclosure.

As shown in FIG. 4, the Ethernet protocol compatible packet format can be encoded into the format as shown in FIG. 4. The format 4 includes a destination MAC (DMAC) address 41, a source MAC (SMAC) address 42, an Ether type (Etype) section 43, an IP header section 44, a header for PLOAM over Ethernet section 45 and a PLOAM message section 46.

Likewisely, the DMAC address 41, the SMAC address 42 and the Etype address sections 43 respectively takes up 6 bytes, 6 bytes and 4 bytes in the format 4. The IP header section 44 is a section for Internet Protocol for version 4 or version 6 (IPv4 or IPv6). The protocol field in the IPv4 header or Next Header field in the IPv6 header are used to indicate the "Header for PLOAM over Ethernet." The header section 34 may be a standard header to convey PLOAM message over an Ethernet, while the header section 34 may also be user-defined header. The PLOAM message section 35 is defined by ITU-T and is especially for passive optical network (PON). The format 4 as depicted in FIG. 4 can be transmitted over Layer 3 protocol (L3 protocol, aka the IP layer).

Figure 5:
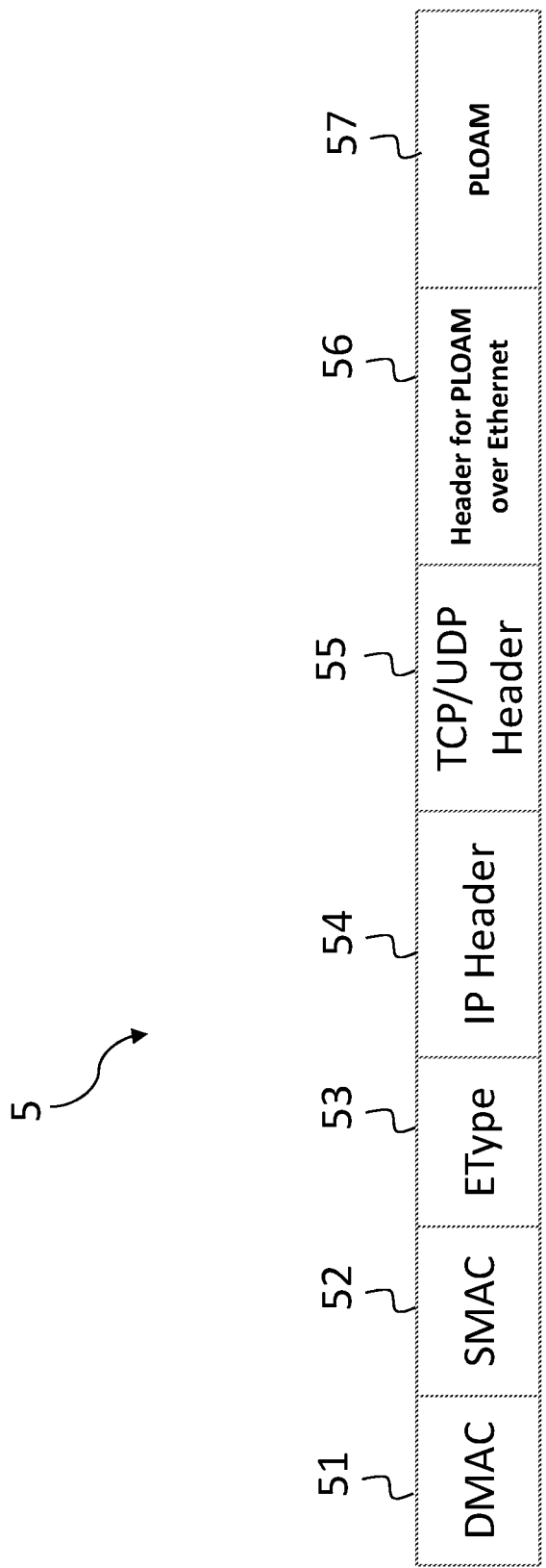
FIG. 5 illustrates a Ethernet protocol compatible packet format according to yet another embodiment of the present disclosure; and Reference is next made to FIG. 6, which illustrates a communication system in which PLOAM message is transmitted over Ethernet.

Reference is next made to FIG. 5, which illustrates an Ethernet protocol compatible packet format according to yet another embodiment of the present disclosure. As shown in FIG. 5, the Ethernet protocol compatible packet format can be encoded into the format as shown in FIG. 5. The format 5 includes a destination MAC (DMAC) address 51, a source MAC (SMAC) address 52, an Ether type (Etype) section 53, an IP header section 54, a TCP/UDP header section 55, a header for PLOAM over Ethernet section 56 and a PLOAM message section 57.

Likewisely, the DMAC address 51, the SMAC address 52 and the Etype address sections 53 respectively takes up 6 bytes, 6 bytes and 4 bytes in the format 5. The IP header section 54 is a section for Internet Protocol for version 4 or version 6 (IPv4 or IPv6). The TCP/UDP header section 55 is a header for transmission control protocol (TCP) or user datagram protocol (UDP). The header section 56 may be a standard header to convey PLOAM message over an Ethernet, while the header section 56 may also be user-defined header. The PLOAM message section 57 is defined by ITU-T and is especially for passive optical network (PON). The format 5 as depicted in FIG. 5 can be transmitted over Layer 4 protocol (L4 protocol).

According to the foregoing description, the PLOAM message is not processed at the second terminal but at the external CPU. It can be understood that, in the present disclosure, an external CPU is counted on to handle the PLOAM message, rather than having the message processed at the second terminal. Comparing to prior art, which have one or more CPUs embedded in the second terminal to process the PLOAM message, the second terminal of the present disclosure need not to leave space for CPU(s). In this regard, the second terminal of the present disclosure can save more die area when manufacturing, as well as design time/cycle. Moreover, since the second terminal does not process PLOAM message, power consumption can be saved. Last but not the least, man power and cost can also be saved.

Since PLOAM message exists in various kinds of communication systems such as copper twisted pair broadband access technologies, like xDSL (ADSL, VDSL, VDSL2) and G.Fast, the present disclosure can be applied in these different kind of scenarios.

For instant, if the method of the present disclosure is applied in an optical system, the first terminal may be an optical line terminal (OLT) and the second terminal may be an optical network unit (ONU). The OLT and the ONU are connected through, for example, fiber. Further, an external CPU is connected with the ONU through an Ethernet protocol.

Figure 6:
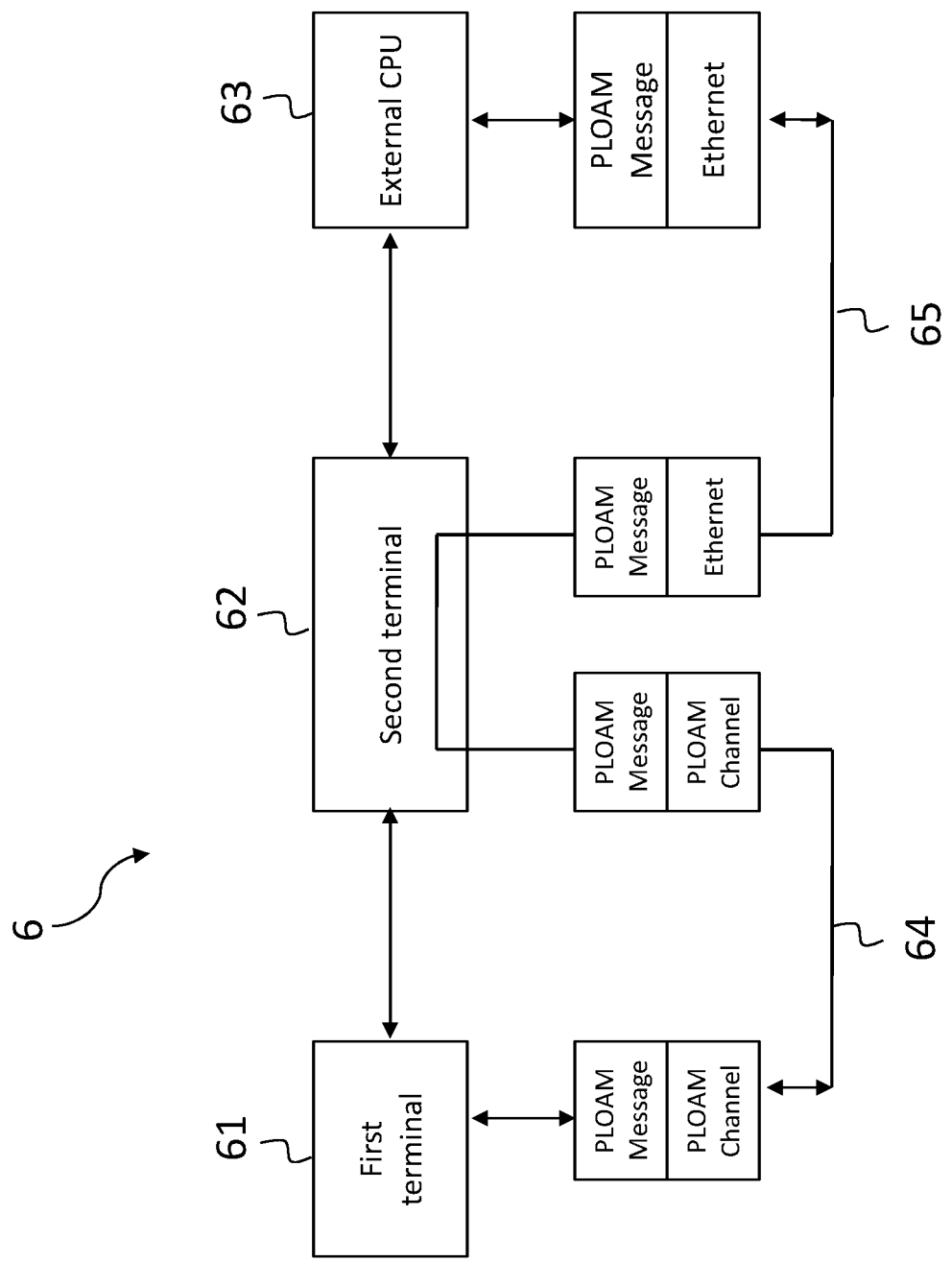

Reference is next made to FIG. 6, which illustrates a communication system in which PLOAM message is transmitted over Ethernet. As can be seen in FIG. 6, the communication system 64 includes a first terminal 61, a second terminal 62 and an external CPU 63. The first terminal 61 and the second terminal 62 are preferably connected through a fiber 64, and the second terminal 62 and the external CPU 63 are preferably connected through an Ethernet network 65 (or Ethernet protocol).

It should be noted that, since PLOAM message exists in various kinds of communication systems such as copper twisted pair broadband access technologies, like xDSL (ADSL, VDSL, VDSL2) and G.Fast, the present disclosure can be applied in these different kind of scenarios. Thus, in the present embodiment, the first terminal 61 is implemented as an optical line terminal (OLT), and the second terminal 62 is implemented as an optical network unit (ONU).

The first terminal 61 serves as a central apparatus, and according to the embodiment of the present disclosure, the first terminal 61 may transmits a physical layer operation administration and maintenance (PLOAM) message to the second terminal 62. The transmission of the PLOAM message is carried out on a PLOAM channel (i.e., the fiber 64), as can be seen in FIG. 6. For people with ordinary skill in the art, it is well understood that in the Next-Generation Passive Optical Network 2 standard (NG-PON2 standard), there are two options for the PLOAM channel. However, each option may be implemented in the present disclosure. That is to say the present disclosure does not limit the PLOAM channel to any option.

According to the present disclosure, the second terminal 62 do not process the PLOAM message after it receives the PLOAM message. Instead, after the second terminal 62 extracts the PLOAM message from the fiber 64, the second terminal 62 further encodes the PLOAM message to transform the PLOAM message into a PLOAM-over-Ethernet packet format, and then the second terminal 62 sends out this PLOAM-over-Ethernet packet format message over the Ethernet network 65 to the external CPU 63 for processing. The external CPU 63 then processes the received PLOAM message. Afterwards, a processed PLOAM message is obtained after processing.

From the foregoing description, it can be understood that an external CPU (e.g., the external CPU 63) is counted on to handle the PLOAM message. Comparing to prior art, which has one or more CPUs embedded in the second terminal 62 to process the PLOAM message, the second terminal (i.e., the ONU 62) of the present disclosure need not to leave space for CPU(s). In this regard, the second terminal 62 (or the ONU 62) of the present disclosure can save more die area when manufacturing, as well as design time/cycle. Moreover, since the second terminal 62 does not process PLOAM message, power consumption can be saved. Last but not the least, man power and cost can also be saved.

It is worth to further note that the PLOAM message originated form the first terminal 61 is in a PLOAM compatible form, so that the message can be transmitted over a PLOAM channel (i.e., fiber 64). However, since the connection between the second terminal 62 and the external CPU 63 is implemented through Ethernet protocol, the PLOAM message sent form the first terminal 61 cannot be transmitted directly to the external CPU 63 without modification to the PLOAM message. Therefore, the second terminal 62 further, by performing an encoding scheme, to transform the PLOAM message into a specific packet format that can be transmitted over Ethernet protocol (i.e., fiber 64). This specific packet format is referred to as Ethernet protocol compatible packet format.

Reference is made back to FIG. 3, which illustrates the Ethernet protocol compatible packet format according to the embodiment of the present disclosure. In FIG. 3, the PLOAM-over-Ethernet packet format 3 includes a destination MAC (DMAC) address 31, a source MAC (SMAC) address 32, an Ether type (Etype) section 33, a header section 34 and a PLOAM message section 35.

As described above, the DMAC address 31, the SMAC address 32 and the Etype address sections respectively takes up 6 bytes, 6 bytes and 4 bytes in the format 3. The header section 34 may be a standard header to convey PLOAM message over an Ethernet, while the header section 34 may also be user-defined header. The PLOAM message section 35 is defined by ITU-T and is especially for passive optical network (PON).

The Ethernet protocol compatible packet format can also be encoded into the data format as shown in FIG. 4 or FIG. 5. That is to say, in the communication system 6 of the present disclosure, the PLOAM message sent by the first terminal 61 can be, by practical, encoded into any kind of data format as shown in FIGS. 3-5. That is, if data is desired to be transmitted though layer 3 protocol, then data is encoded into FIG. 4's data format. If data is desired to be transmitted through layer 4 protocol, than data is encoded into FIG. 5's data format.

Reference is made back to FIG. 6. The external CPU 63, after processing, sends back the processed PLOAM message to the second terminal 62 through the Ethernet protocol. The second terminal 62 next extracts the processed PLOAM message from the Ethernet network. It should be noted that the processed PLOAM message is now in Ethernet protocol data format, so that the second terminal 62 further performs a decoding scheme to the processed PLOAM message to transform the message into a PLOAM compatible data format before sending the message to the first terminal 61.

According to the foregoing description, the PLOAM message is not processed at the second terminal 62 but at the external CPU 63. It can be understood that an external CPU (i.e., the CPU 63) is counted on to handle the PLOAM message, rather than having the message processed at the second terminal 62 (i.e., the ONU 62). Comparing to prior art, which have one or more CPUs embedded in the second terminal (the ONU 62) to process the PLOAM message, the ONU 62 of the present disclosure need not to leave space for CPU(s) to be embedded in. In this regard, the second terminal 62 of the present disclosure can save more die area when manufacturing, as well as design time/cycle. Moreover, since the ONU 62 does not process PLOAM message, power consumption can be saved. Last but not the least, man power and cost can also be saved.

Due the advantages that can be achieved by the present disclosure, the method and system of the present disclosure can be applied in many scenarios, such as gigabit passive optical networks (GPON), point to point communications, or any sorts of fiber communications. The method and system of the present disclosure can be further applied in any communication over copper lines such as very-high-bit-rate digital subscriber line (VDSL), VDSL2 or digital subscriber line (G. fast).

The invention claimed is:

1. A method for transmitting a physical layer operation administration and maintenance (PLOAM) message over an Ethernet network, comprising the steps of:
   transmitting, from a first terminal, the PLOAM message to a second terminal over a PLOAM channel connecting the first and second terminals;
   extracting, by the second terminal, the PLOAM message;
   sending, from the second terminal, the extracted PLOAM message to an external CPU over an Ethernet protocol; and
   processing, by the external CPU, the received PLOAM message to generate a processed PLOAM message;
   wherein in the step of sending, from the second terminal, the extracted PLOAM message to the external CPU over the Ethernet protocol, the extracted PLOAM message is encoded into an Ethernet protocol compatible packet format;
   wherein the Ethernet protocol compatible packet format includes a destination MAC address section, a source MAC address section, an Ether type section, an IP header section, a header for PLOAM over Ethernet section and a PLOAM message section.

2. The method as claim 1, wherein the Ethernet protocol compatible packet format includes:
   a destination MAC address section;
   a source MAC address section;
   an Ether type section;
   an IP header section;
   a TCP/UDP header section;
   a header for PLOAM over Ethernet section; and
   a PLOAM message section.

3. The method as claim 1, further comprising:
   sending, by the external CPU, the processed PLOAM message to the second terminal over the Ethernet protocol.

4. The method as claim 3, further comprising:
   extracting, by the second terminal, the processed PLOAM message; and
   sending, by the second terminal, the processed PLOAM message to the first terminal through the PLOAM channel.

5. The method as claim 4, wherein in the step of sending, by the second terminal, the processed PLOAM message to the first terminal through the PLOAM channel, the processed PLOAM message is decoded by the second terminal into a PLOAM compatible data format.

6. The method as claim 1, wherein the first terminal is an optical line terminal (OLT), and the second terminal is an optical network unit (ONU).

7. A communication system, comprising:
   a first terminal;
   a second terminal, connected with the first terminal through a fiber; and
   an external CPU, connected with the second terminal through an Ethernet protocol;
   wherein a physical layer operation administration and maintenance (PLOAM) message is transmitted from the first terminal to the second terminal and the second terminal extracts the PLOAM message, and the second terminal then sends the extracted PLOAM message to the external CPU through the Ethernet protocol, and the external CPU processes the message to generate a processed PLOAM message;
   wherein the extracted PLOAM message is encoded into an Ethernet protocol compatible packet format;
   wherein the Ethernet protocol compatible packet format includes a destination MAC address section, a source MAC address section, an Ether type section, an IP header section, a header for PLOAM over Ethernet section and a PLOAM message section.

8. The communication system as claim 7, wherein the Ethernet protocol compatible packet format includes:
   a destination MAC address section;
   a source MAC address section;
   an Ether type section;
   an IP header section;
   a TCP/UDP header section;
   a header for PLOAM over Ethernet section; and
   a PLOAM message section.

9. The communication system as claim 7, wherein the external CPU further sends the processed PLOAM message to the second terminal over the Ethernet protocol.

10. The communication system as claim 9, wherein the second terminal extracts the processed PLOAM message and sends the processed PLOAM message to the first terminal through the PLOAM channel.

11. The communication system as claim 10, wherein the processed PLOAM message is decoded by the second terminal into a PLOAM compatible data format.

12. The communication system as claim 7, wherein the first terminal is an optical line terminal (OLT), and the second terminal is an optical network unit (ONU).

* * * * *